United States Patent
Light

(10) Patent No.: US 7,621,386 B2
(45) Date of Patent: Nov. 24, 2009

(54) VISCOUS FAN DRIVE HAVING MODIFIED LAND DESIGN AND ARMATURE VENTING

(75) Inventor: Gerard M. Light, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 228 days.

(21) Appl. No.: 11/366,183

(22) Filed: Mar. 2, 2006

(65) Prior Publication Data

US 2007/0205071 A1 Sep. 6, 2007

(51) Int. Cl.
F16D 35/02 (2006.01)

(52) U.S. Cl. .................................. 192/58.61; 192/58.7

(58) Field of Classification Search ........ 192/58.5–58.8, 192/82 T, 58.4
See application file for complete search history.

(56) References Cited

U.S. PATENT DOCUMENTS

| | | | |
|---|---|---|---|
| 4,302,156 A * | 11/1981 | LaFlame | 416/169 A |
| 4,403,757 A | 9/1983 | Shepherd | |
| 4,437,554 A * | 3/1984 | Haeck | 192/58.62 |
| 4,741,421 A * | 5/1988 | Johnston | 192/58.682 |
| 4,779,323 A | 10/1988 | Bloemendaal | |
| 5,014,755 A | 5/1991 | Bompard et al. | |
| 5,101,950 A | 4/1992 | Schoenmeyer | |
| 5,111,923 A * | 5/1992 | Kennedy | 192/58.7 |
| 5,323,809 A | 6/1994 | Tischer et al. | |
| 5,497,868 A | 3/1996 | Ohhara | |
| 6,021,747 A * | 2/2000 | Gee et al. | 123/41.12 |
| 6,752,251 B2 | 6/2004 | May et al. | |
| 7,293,636 B2 * | 11/2007 | May | 192/58.61 |
| 2001/0030589 A1 | 10/2001 | Dahlgren et al. | |
| 2004/0046062 A1 | 3/2004 | Xu et al. | |

FOREIGN PATENT DOCUMENTS

EP 0 105 646 4/1984

* cited by examiner

Primary Examiner—Richard M. Lorence
(74) Attorney, Agent, or Firm—John A. Artz

(57) ABSTRACT

A viscous fan drive in which the output drive to the fan is controlled by the movement of viscous fluid from a fluid reservoir and into the operating and working chamber of the coupling during normal operation. The input-coupling assembly and cover member are formed with a unique combination of continuous and non-continuous radially extending lands and grooves designed to distribute the viscous fluid in a continuous film throughout the shear zone so as to maximize output fan speed at a given input speed. An armature-venting feature is designed to simplify the opening and closing of the valve disk in an electronic version of the viscous fan drive depending upon the desired operating condition.

16 Claims, 4 Drawing Sheets

VISCOUS FAN DRIVE HAVING MODIFIED LAND DESIGN AND ARMATURE VENTING

CROSS REFERENCE TO RELATED APPLICATION(S)

The present invention is related to U.S. Pat. No. 6,752,251, filed on Nov. 4, 2002, and to U.S. patent application Ser. No. 11/170,828, filed on Jun. 30, 2005, which are incorporated by reference herein.

TECHNICAL FIELD

The invention relates generally to fan drive systems and more specifically to a viscous fan drive having a modified land design and improved armature venting.

BACKGROUND ART

The present invention relates to fluid-coupling devices of the type including both a fluid operating chamber and a fluid reservoir chamber, and valving which controls the quantity of fluid in the operating chamber. The devices may be electronically or mechanically controlled.

Although the present invention may be used advantageously in fluid-coupling devices having various configurations and applications, it is especially advantageous in a coupling device of the type used to drive a radiator cooling fan of an internal combustion engine, and will be described in connection therewith.

Fluid-coupling devices ("fan drives") of the viscous shear type have been popular for many years for driving engine cooling fans, primarily because their use results in substantial saving of engine horsepower. The typical fluid-coupling device operates in the engaged, relatively higher speed condition only when cooling is needed, and operates in a disengaged, relatively lower speed condition when little or no cooling is required.

For many years, one of the problems associated with fluid-coupling devices used to drive radiator cooling fans is that these fan drives experience slow response times to engage. It is desirable to operate viscous fan drives in a disengaged mode at lower fan speeds to improve fuel economy. However, the lower the fan speed, the more difficult it is to get the fan drives to engage. This is because the fluid reservoir on these drives is located on the slow speed members that turn at fan speed.

In order to aid in response times, generally radially slots have been used in the cover and clutch to help get fluid in and out of the labyrinth (otherwise known as the shear space and defined by lands and grooves) of the fluid operating chamber to help engage and disengage the fan drive. These radial slots improve pump-out performance and affect modulation characteristics of bimetallic or electronic control. However, these designs are generally such that the radial slots extend from the innermost lands of the labyrinth to the outermost lands of both the cover and clutch. When viscous fluid is first metered into the labyrinth it does not form a consistent film. It appears to be shredded within the labyrinth as it is flung radially outward. This gives inconsistent torque generation. Torque generation only becomes predictable/consistent after sufficient fluid has been introduced into the labyrinth such that a continuous fluid film has been formed.

It is thus highly desirable to improve response time for a viscous fan drive to engage. A faster responding drive will make electronic control, if utilized, easier and facilitate on-board diagnostics. Such improvements in engagement, however, should not affect disengagement performance.

Another problem with current electronically controlled viscous fan drives involves electronic control of the fluid control valve. In current viscous fan drive system, the fluid control valve is moved by a magnetic solenoid built into and is a part of the primary support shaft. The support shaft has a wafer of non-magnetic material welded into the shaft. A magnetic coil is positioned around the shaft. When the coil is energized, the resulting magnetic field creates a circuit that extends radially through the sidewalls of the shaft, then axially through the plug and the armature. The armature moves along the axis in response to the magnetic force and a return spring. The armature is guided by a close fitting bushing. As the armature moves fore and aft, a volume of air defined within a chamber defined by the shaft, plug and armature changes. Without venting, the air trapped in this space will create a pressure (push) or vacuum (pull) on the armature as it moves away from its equilibrium position. Thus, increased electrical power is necessary to overcome the effects of the trapped air. It is highly desirable to minimize the effects of this trapped air by providing means for venting the air as the armature moves away from an equilibrium position.

SUMMARY OF THE INVENTION

The present invention addresses some of the issues described above by providing viscous fan drive system in which the radial slots do not cut across the outermost lands. Viscous fluid in the labyrinth will impact into an innermost one of at least one continuous lands located radially outwardly at the end of the radial slots of the cover and clutch as it is flung radially outwardly within the labyrinth. Since the clearance between the lands and grooves in this area of the shear space is small and the shear space is continuous, the viscous fluid travel will be restricted. As such, a continuous film develops between the adjacent surfaces of the continuous lands in the clutch and cover in the labyrinth or shear space, which in turn results in a much larger torque generation (i.e. increase in fan speed, or engagement) at a given input speed. Hence, the fan drive engages more quickly without adversely affecting disengagement performance.

In addition, the present invention also provides a mechanism specific to an electronically controlled viscous fan drive for overcoming the problems associated with venting trapped air within the input coupling assembly as the armature and coupled valve arm move in response to a magnetic field generated to control the relative engagement of the fan drive. To accomplish this, a portion of the outer surface of the armature shaft and the inner surface of the armature are formed with complimentary, yet different shapes. Thus, when the portion of the armature shaft is pressed within the inner surface of the armature and introduced within the input coupling assembly, one or more channels (i.e. spaces) are created between the outer surface and inner surface. These channels allow air to move between a first and second chamber defined by the input coupling assembly, the armature, the armature shaft, and the plug, depending upon the relative positioning of the armature within the input coupling assembly. In one preferred embodiment, the armature shaft is formed with a squared end having trimmed corners, while the armature is formed with an inner rounded bore. Thus, when the squared end is pressed within the inner rounded bore, four channels are created between the armature shaft and armature that allow air to be vented within the input coupling assembly between a first and second chamber as the armature moves the valve disk to control the relative torque engagement of the output portion of the fan drive.

Other features, benefits and advantages of the present invention will become apparent from the following description of the invention, when viewed in accordance with the attached drawings and appended claims.

BEST MODE(S) FOR CARRYING OUT THE INVENTION

Figure 1:
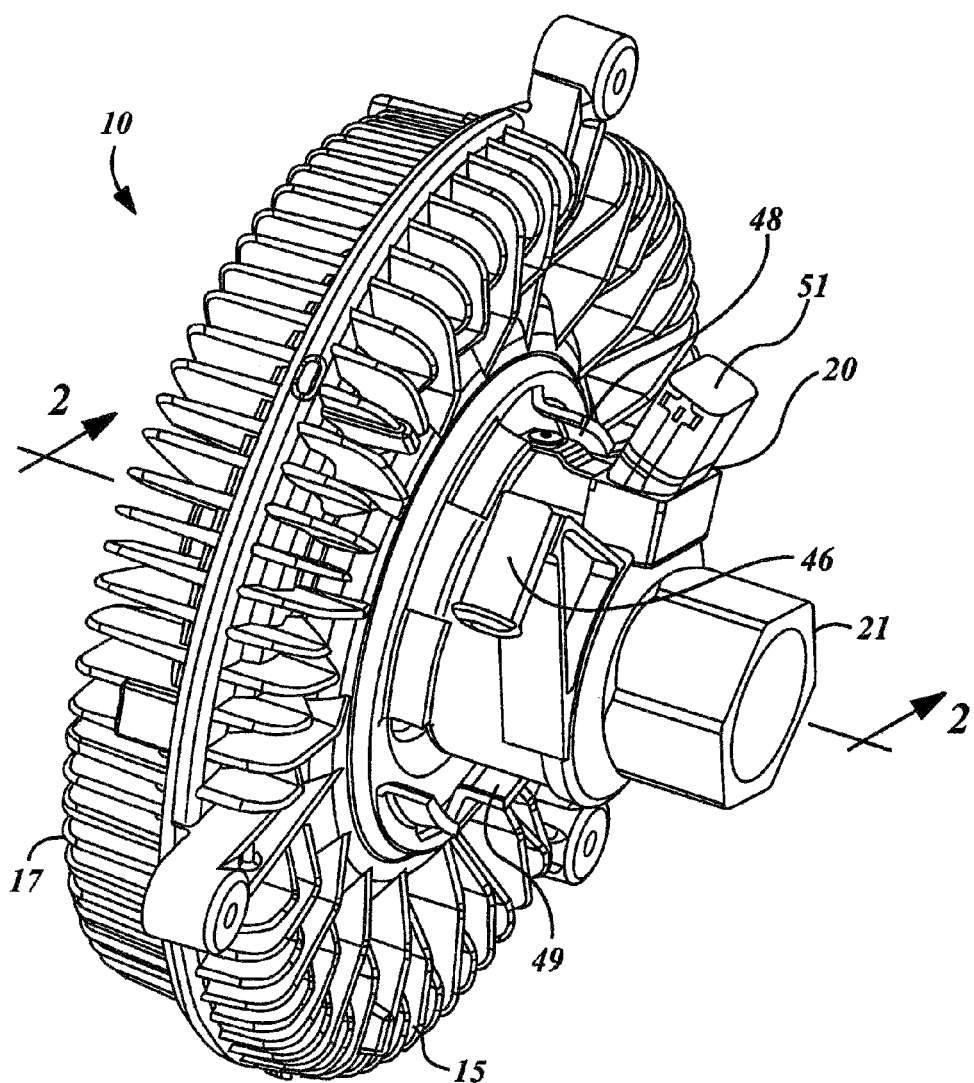
FIG. 1 is a perspective view of a fluid-coupling device according to one preferred embodiment of the present invention.

Referring now to the drawings, which are not intended to limit the invention, FIGS. 1-6 illustrates one preferred form of a fluid-coupling device 10 ("viscous fan drive") of a type utilizing the present invention. The fluid-coupling device 10 includes an input-coupling member, or clutch, generally designated 11, and an output-coupling member, or assembly, generally designated 13. The assembly 13 includes a housing member (body) 15, and a cover member (enclosure) 17, the members 15 and 17 being secured together by a rollover of the outer periphery of the cover member 17, as is well known in the art.

The fluid-coupling device 10 is adapted to be driven by a liquid cooled engine, and in turn, drives a radiator-cooling fan, neither of which is shown herein. The fan may be attached to the housing member 15 by any suitable means, such as is generally well known in the art, and as is illustrated in the above-incorporated patents. It should be understood, however, that the use of the present invention is not limited to any particular configuration of fluid-coupling device, or fan mounting arrangement, or any particular application for the fan drive, except as is specifically noted hereinafter. For example, the present invention could be used with a fan drive of the type adapted to have the radiator-cooling fan attached to the cover member, rather than to the body member.

Figure 2:
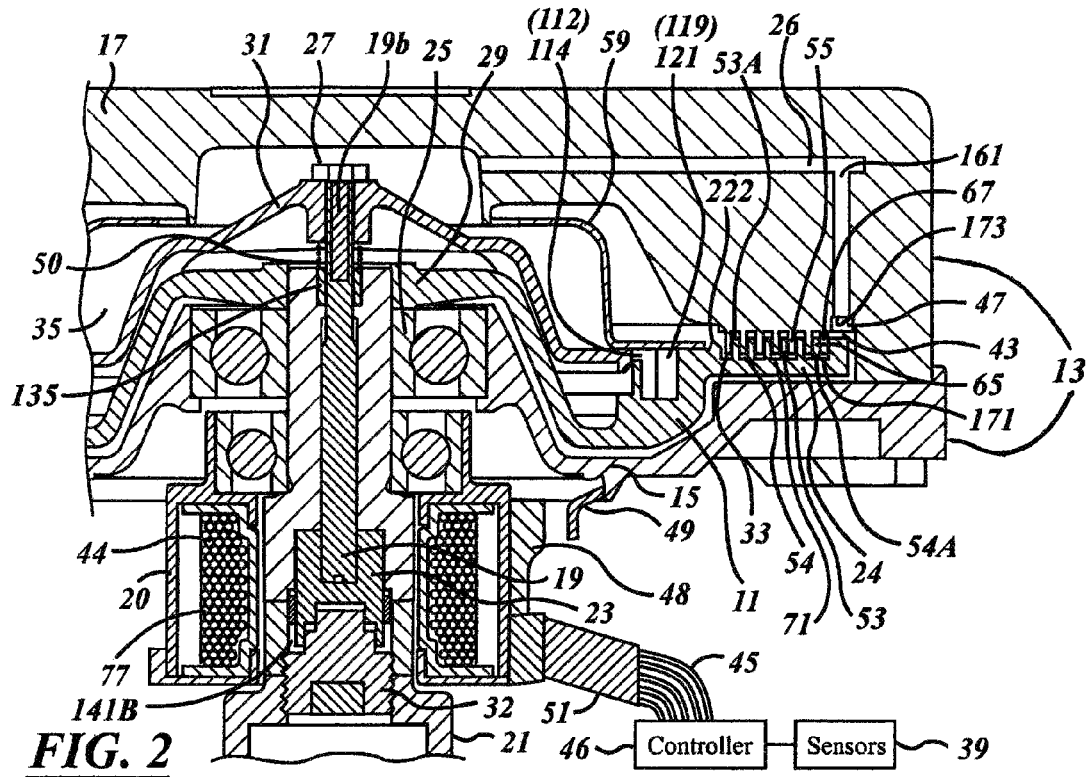
FIG. 2 is a section view of FIG. 1 taken along line 2-2 showing the fluid-coupling device in a disengaged position.
Figure 3:
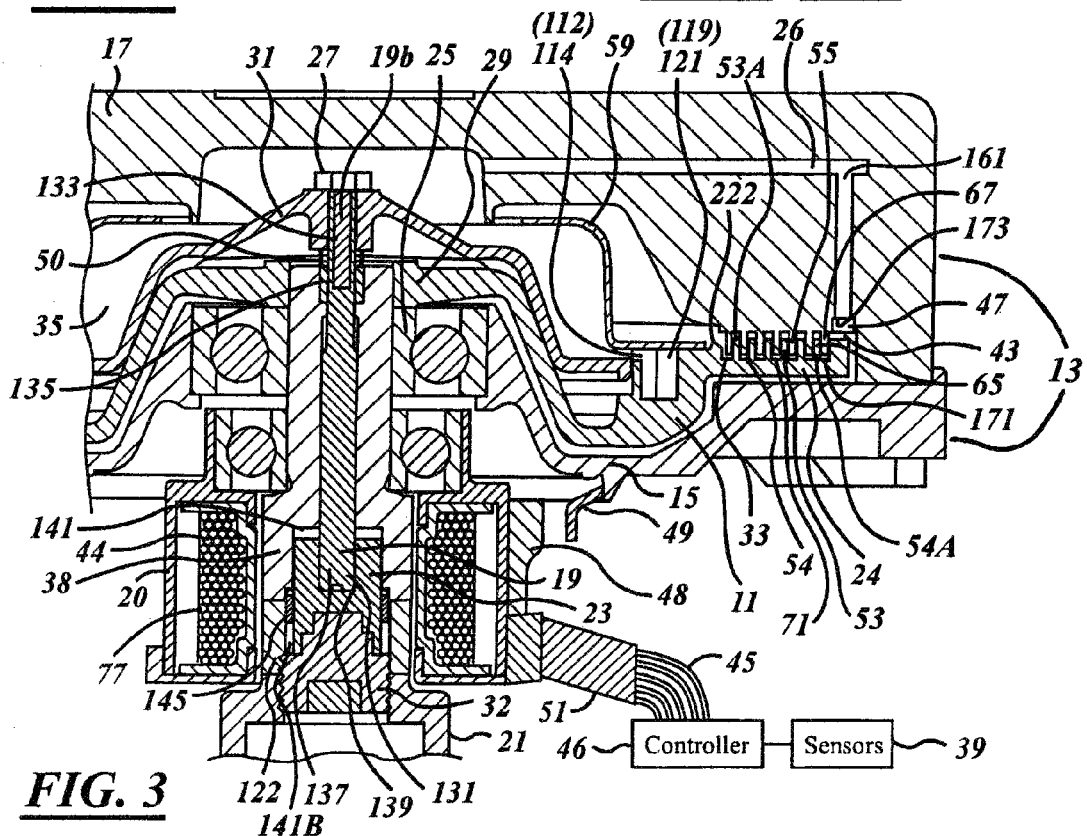
FIG. 3 is a section view of FIG. 1 taken along line 2-2 showing the fluid-coupling device in a fully engaged position.

As best shown in FIGS. 2 and 3, the coupling device 10 includes an input-coupling assembly 38 on which the input-coupling member 11, or clutch, is mounted. The input-coupling assembly 38 is rotatably driven, such as by means of an hexagonal, internally threaded portion 21, which would typically be threaded onto an externally threaded shaft extending from an engine water pump. The assembly 38 functions as a support for the inner surface of a bearing set 25, which is seated on the inside diameter of the housing member 15. The input coupling assembly 38 is also coupled to and surrounds an actuator shaft 19. The forward end 19b of an actuator shaft 19 is slidingly engaged between the assembly 38 and an opening defined by a hub portion 29 of the input-coupling member 11. As a result, rotation of the assembly 38 causes rotation of the input-coupling member 11. An armature 23 is also coupled to a portion of the actuator shaft 19, which is kept in place within the assembly 38 by a plug 32. The armature 23 is guided within the assembly using a close-fitting bushing 145.

The housing member 15 and the cover member 17 cooperate to define a fluid chamber, which is separated by means of a substantially circular valve disk 31 and reservoir cover 59, into a fluid operating chamber 33 and a fluid reservoir chamber 35. The valve disk 31 is operatively coupled with the forward end 19b of the actuator shaft 19 by screw 27 and is disposed within the reservoir cover 59 and the input-coupling member 11. The cover member 17 and the input-coupling member 11 define the fluid operating chamber 33, while the reservoir cover 59 and the input-coupling member 11 define the fluid reservoir 35.

Figure 4:
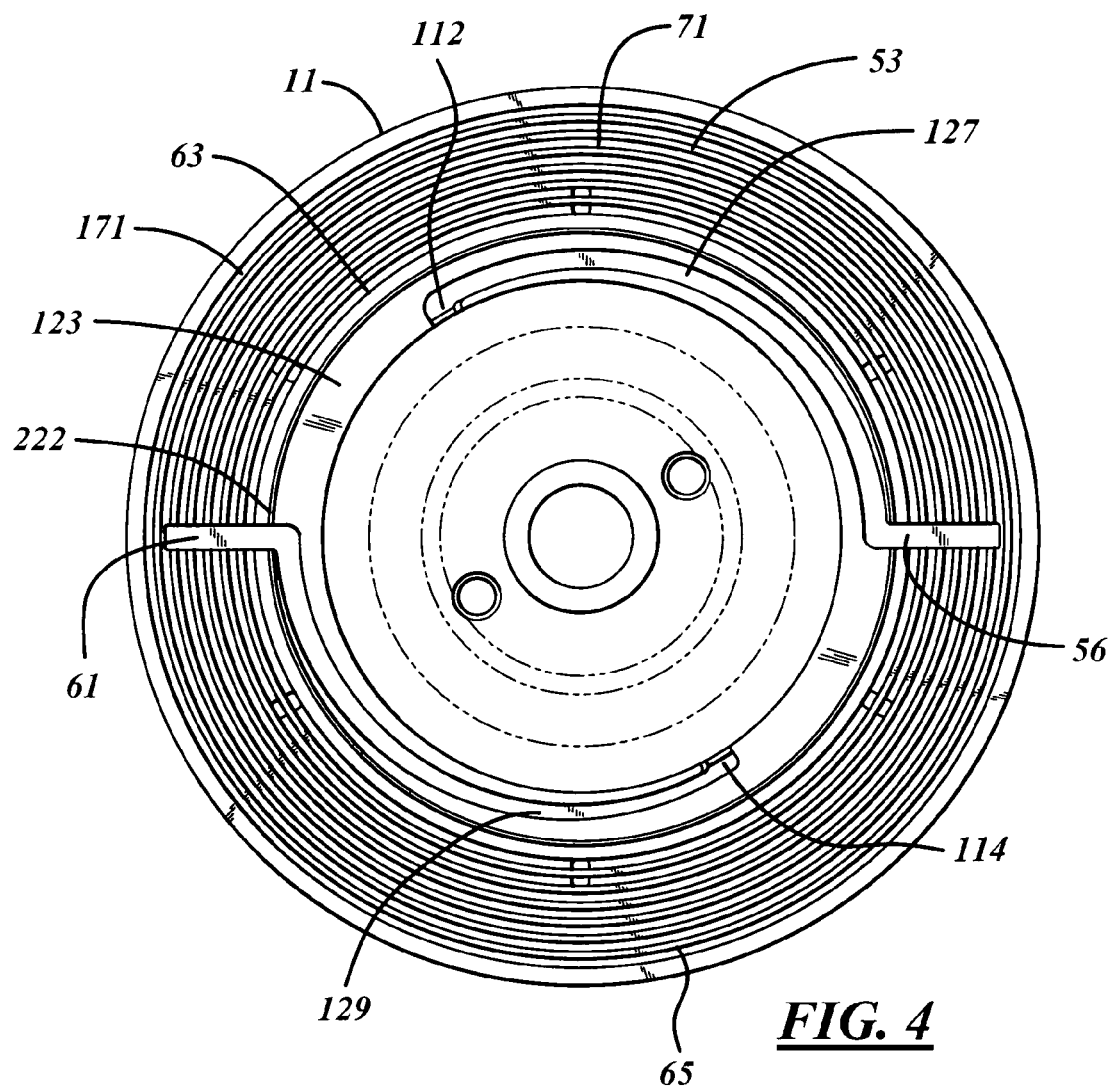
FIG. 4 is a perspective view of the one side of the clutch according to a preferred embodiment of the invention.
Figure 5:
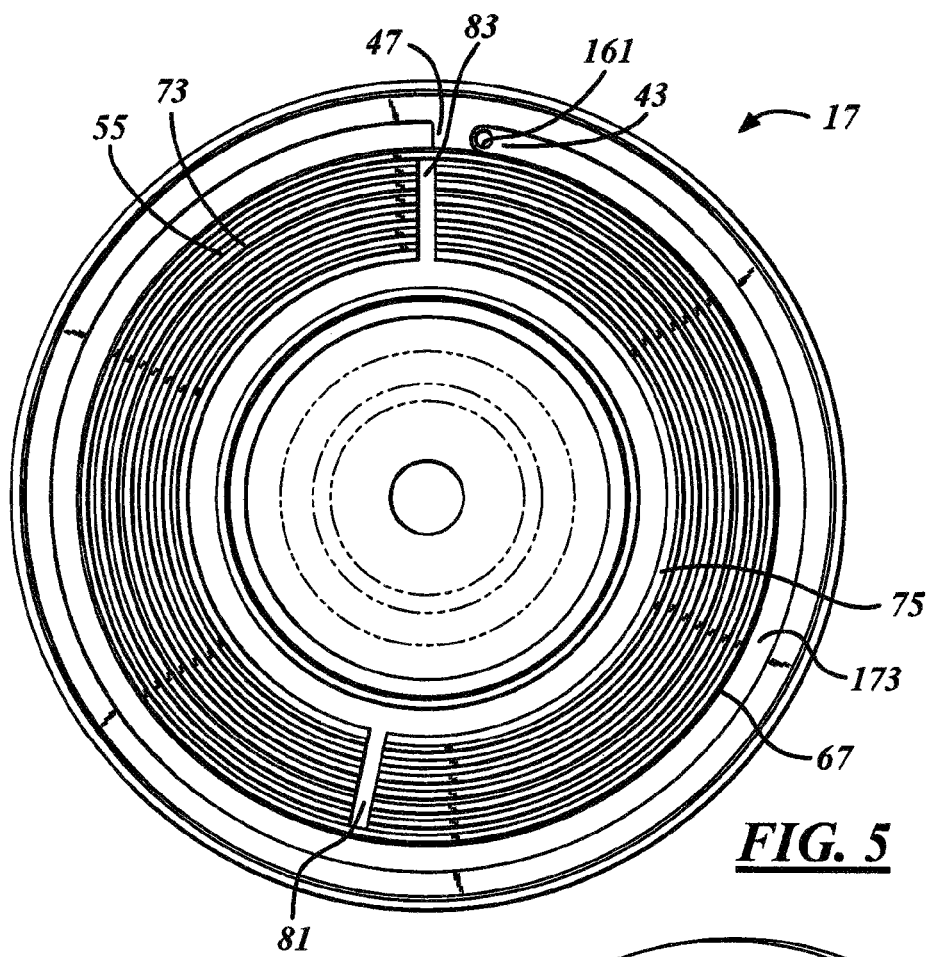
FIG. 5 is a perspective view of one side of the cover member and wiper according to a preferred embodiment of the present invention.

As best seen in FIGS. 4 and 5, the input-coupling member 11 includes a plurality of non-continuous annular lands 53 that are located outwardly from the hub 29 and therein define a plurality of non-continuous grooves 71 between each respective pair of lands 53. The input coupling member 11 also includes one or more continuous lands (here shown as one continuous land 65) and one or more continuous grooves 171 formed radially outwardly of the outwardmost one of the non-continuous lands 53. The adjacent surface of the cover member 17 include a plurality of corresponding non-continuous annular lands 55 and therein define a plurality of non-continuous grooves 73 between each respective pair of lands 55. The cover member 17 also includes one or more continuous lands (shown as one continuous land 67) and one or more continuous grooves 173 located radially outwardly of the outermost one of the non-continuous lands 55. The non-continuous annular lands 53, 55 and grooves 71, 73 and continuous annular lands 65, 67 and grooves 171, 173 and are interdigitated to define a serpentine-shaped viscous shear space 54 (i.e. labyrinth) therebetween.

The input coupling member 11 and cover member 17 also each include a pair of radial slots 56, 61 and 81, 83 that are used on the input-coupling member 11 and cover 17 to help get viscous fluid in and out of the viscous shear space 54 of the operating chamber 33. In prior art fan drives, these slots extended through all lands of an input-coupling member and all lands of its cover member. In the preferred embodiment disclosed herein, the radial slots 56, 61 and 81, 83 begin at the innermost non-continuous lands 63, 75, and terminate at the innermost one of the respective continuous lands 65 and 67.

The input-coupling member 11 also included a pair of cold pump out slots 127, 129 defined between the rollover 222, and a sealing surface 123. The reservoir cover 59 seals onto the top of the sealing surface 123 held in place by the rollover 222 (shown before the rollover operation). The slots 127 and 129 and reservoir cover 59 therefore define a passageways 119 and 121, respectively. The passageways 119, 121, being oriented 180 degrees opposite each other around the outer periphery of the clutch 11 act as an antidrainback chamber when the fan drive is not rotating therein minimizing morning sickness that typically occurs in viscous type clutch systems.

The cover 59 and input coupling member 11 also define a pair of fill holes 112, 114. The fill holes 112, 114 are preferably disposed 180 degrees opposite each other around the periphery of the input-coupling member 11 with respect to one another and are located at the junction between the reservoir chamber 35 and the respective passageways 119, 121. As will be described in further detail below, the fill holes 112, 114 may be opened or covered (i.e. closed), depending upon the relative positioning of the valve disk 31 relative to the fill holes 112, 114, to control the amount of viscous fluid entering the operating chamber 33 and shear space 54 through the slots 119, 121. Varying the amount of viscous fluid within the shear space 54 varies the wetted area of the shear space 54 and thereby controls the amount of torque transferred from the input coupling member 11 to the cover member 17 at a given engine input speed. The cover member 17 also includes a pumping element 47, also referred to as a "wiper" element, operable to engage the relatively rotating fluid in the shear space 54, and generate a localized region, or scavenge area 43 of relatively higher fluid pressure. As a result, the pumping element 47 continually pumps a small quantity of viscous fluid from the shear space 54 back into the reservoir chamber 35 through a scavenge hole 161 coupled to a radial passage 26 defined by the cover member 17 at a given engine input speed, in a manner well known in the art.

Referring now to FIGS. 1-3, the actuator subassembly 20 includes a plurality of coils 77 contained within a bobbin 44. The coils 77 are electrically coupled to an external controller 46 through wires 45 contained within an electrical connector 51 coupled to the bobbin 44. The external controller 46 is also electrically coupled to a Hall effect sensor 48 through connector 51. The Hall effect sensor 48 senses the rotational speed of the housing member 15 via one or more pole pieces 49 coupled to the housing member 15 and sends an electrical impulse to the controller 46 as a function of the measured rotational speed. A plurality of other sensors 39, including, for example, an engine temperature sensor, are also electrically connected to the controller 46 and provide electrical signals regarding a particular engine operating parameter.

The controller 46 interprets the electrical signals from the Hall effect sensor 48 and other sensors 39 and sends an electrical signal to the coils 77 to control the relative positioning of the valve disk 31 to control the relative engagement or disengagement of the output coupling member 13.

As may be best seen in FIG. 2, when the coupling device 11 is rotating and in the disengaged position, a spring 50 biases the valve disk 31 to cover the fill holes 112, 114, and hence substantially all of the viscous fluid in the device 10 is contained within the fluid reservoir chamber 35. The spring 50, as shown in FIGS. 2 and 3, is coupled along the outer periphery of the actuator shaft 19 and between the valve disk 31 and the adjacent end of input coupling assembly 38. In the disengaged position, viscous fluid is prevented by the valve disk 31 from entering the operating chamber 33 and shear space 54 to drive cover member 17. In FIG. 3, when the coupling device 11 is rotating and in the fully engaged position, viscous fluid flows freely through the respective fill hole 112, 114 to the operating chamber 33 to drive the cover member 17 and coupled fan as a function of the given input speed and amount of viscous fluid contained in the shear space 54. Each is described in further detail below.

To engage the fan drive, as shown in FIG. 3, the external controller 46 sends an electrical signal through the actuator subassembly 20 to the electrical coil 77, therein creating a magnetic flux through the input-coupling assembly 38 within the viscous fan drive 10, including the armature shaft 19, armature 23 and plug 32, but not through a non-magnetic metal wafer portion 122 welded to a portion of the assembly 38. The armature 23, which is common steel, reacts in response to the magnetic flux to axial move in a direction away from the spring 50 (i.e. moving in a direction against the spring 50 (downward in FIG. 3) ) within the assembly 38 and along the bushing 145. As the actuator shaft 19 and valve disk 31 are coupled to the armature 23, they are pulled downward as well, thereby causing valve disk 31 to unseal from the reservoir cover 59 and uncover the cast-in fill holes 112, 114, thereby allowing the movement of viscous fluid from the reservoir chamber 35 to the operating chamber 33 through the respective slots 119, 121 and through slots 56, 61. This viscous fluid then enters the shear space 54. As the fluid fills the shear space 54 it transmits torque from the input coupling member 11 to the cover member as it is sheared, thereby driving the cover member 17 (and hence the output coupling member 13 including a fan remotely coupled to the cover member 17) as a function of the input speed to the input-coupling member 11 and as a function of the amount of viscous fluid contained in the shear space 54, as is understood by those of ordinary skill in the art. This is the so-called engaged position, as shown in FIG. 3.

By decreasing the amount of power to the actuator subassembly 20, and hence magnetic flux available to pull the armature 23 downward, the spring 50 biases back towards its natural position (back toward the position as shown in FIG. 3), thereby urging the valve disk 31 back towards the reservoir cover 59 to partially cover the fill hole 112, 114. This allows viscous fluid to enter the operating chamber 33 through the fill hole 112, 114, but at a rate less than the fully engaged position. This is the so-called mid-range or partially engaged position. In this position, the cover member 17 and output coupling member 13 rotates at a rate slower than the fully engaged position as a function of the relatively lesser amount of viscous fluid entering the shear space 54.

In the absence of electrical actuation, as shown in FIG. 2, the spring 50 biases back to its natural position and therein urges the valve disk 31 upwardly to seal against the reservoir cover 59 and cover the fill hole 112, 114. This prevents viscous fluid from entering the operating chamber 54, and therein prevents the viscous engagement of the cover member 17 and output coupling member 13 as a result.

The amount of electrical power supplied in terms of pulse width modulation (PWM) from the external controller 46 and a power source, and hence the amount of magnetic flux created to drive the armature 23 in response, is determined by the external controller 46. The controller 46 receives a set of electrical inputs from various engine sensors 39, and a Hall effect sensor 48. When the controller 46 determines that one or more of these sensors is sensing an engine operating condition outside a desired range, the external controller 46 and power source will send an electrical signal to the coil 77. Thus, for example, if the external controller 46 determines that the engine coolant temperature is too high as measured by a sensor 39, a signal may be sent from the controller 46 to the actuator subassembly 20 to activate the coil 77 to a desired pulse width, thereby pulling the armature 23 to partially or fully uncover the valve disk 31 from fill holes 112, 114.

Of course, as one of skill in the art appreciates, the actual amount of pulse width modulation necessary to move the valve 31 between a fully engaged position and a disengaged position is dependent upon many factors. For example, the size and shape of the spring 50 itself is a major factor in determining the amount of pulse width modulation necessary to move the armature 23. A stiffer or larger spring 50 may require a larger pulse width to achieve a similar biasing of the spring 50 as compared with a more flexible or smaller spring.

Further, the size of the fill holes 112, 114 may affect the amount of biasing necessary. For example, clutch 11 with larger fill holes 112, 114 may only require the valve disk 31 to slightly uncover one or both of the fill holes 112, 114 in order to provide adequate viscous fluid flow to the operating chamber 33 and shear space 54.

As noted above, in either the engaged or partially engage position, viscous fluid is moved from the reservoir chamber 35 through the fill holes 112, 114 and into the slots 119, 121. The viscous fluid then enters the respective slots 56, 61. A majority of the viscous fluid in these slots 56, 61, is flung radially outwardly and impacts the most radially inward of the continuous outermost lands 65, 67. As the clearance between lands 65, 67 and grooves 171, 173 is small, the fluid travel is restricted and more evenly distributed within the end 54A of serpentine-shaped viscous shear space 54 associated with the lands 65, 67 and grooves 171, 173. A continuous film of viscous fluid is thus contained locally between the lands 65, 67 and grooves 171, 173 in the end 54A of the serpentine-shaped viscous shear space 54 that results in a much larger torque generation and an increase in fan speed at a given input speed.

Tests have indicated that the new electronically controlled viscous fan drive with the new radial slot arrangement as shown in FIGS. 1-5 engaged better without compromising disengagement performance as compared with fan drives having the radial slots extending through all of the lands and grooves of the input coupling member and cover member. Further, tests confirm that the combination of the introduction of continuous outermost lands 65, 67 in both the input-coupling member 11 and cover member 17 were necessary to give the improved response. While the invention is shown with respect to an electronically controlled viscous fan drive, the new land and groove design also works equally well on other types of viscous fan drives not requiring electronic control.

Figure 6:
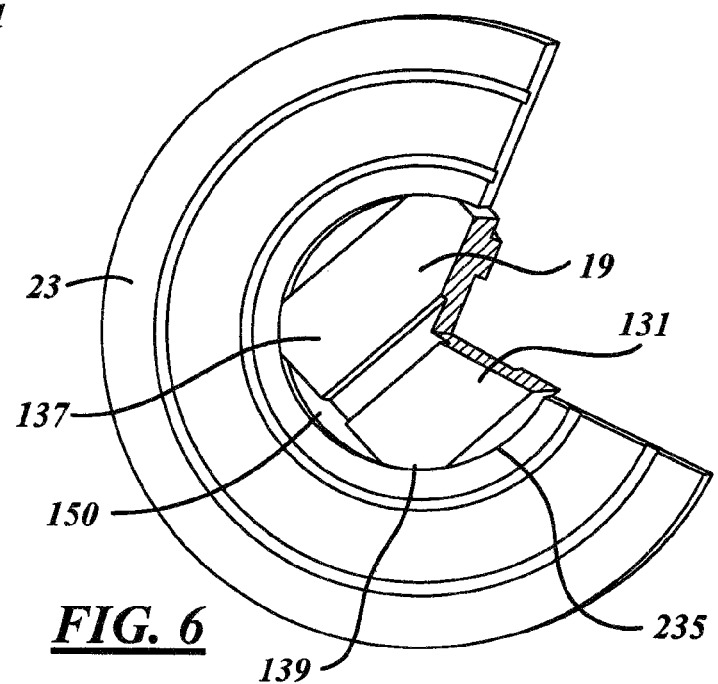
FIG. 6 is a perspective view of the armature according to a preferred embodiment of the present invention.

As mentioned above, the preferred embodiment also provides a method for venting the air contained within the assembly 38 as the armature 23 moves between an engaged, a partially engaged, and a disengaged position. As best shown in FIGS. 2, 3, and 6, the actuator shaft 19 is machined with a square stock 131 at one end and a round bore 133 at the other end that is precision diameter matched to ride along the inside of the guide bushing 135 near the valve 31. The other end 137 of the actuator shaft 19 has the corners 139 of the square stock 131 trimmed to provide good centering and a press fit assembly through the inner rounded bore 235 (see FIG. 6) of the armature 23. The armature 23, as described previously, rides along the inside of the guide bushing 145 within the assembly 38. During movement of the armature 23 between the engaged position and the disengaged position, air is free to pass through (i.e., vent) the spaces 150 between the square stock 131 and the bore 235 from a first chamber 141 created by the assembly 38, actuator shaft 19, and armature 23 and a second chamber 141b defined within the plug 32, armature 23, and bushing 145. This arrangement is an effective way to provide venting of air without adding extra machining operations or features and is believed to provide cost advantages over other designs. Further, the present arrangement minimizes the amount of electrical power needed to open and close the valve 31 as compared with viscous couplings without such venting.

Of course, as one of ordinary skill recognizes, the shape of the end 137 of the actuator shaft 19, and/or the shape of the bore 235, may be varied greatly and still create a variety of different-sized spaces 150 to vent air between the first chamber 141 and the second chamber 141b and still fall within the spirit of the present invention. For example, the end 137 of the actuator shaft 19 could be round and press fit within a squared bore 235. Moreover, a hexagonally shaped end 137 may be press fit within a round bore 235.

The present invention thus provides two separate and distinct means for improving fan drive performance. First, by modifying the land and groove design of the cover and clutch in the viscous shear zone to create at least one continuous land 65, 67 located on both the cover member 17 and the input coupling member 11 adjacent to each other, a continuous film develops between the adjacent surfaces of the clutch and cover in the outer portion 54A of the shear space 54, which in turn results in a much larger torque generation (i.e., an increase in fan speed or engagement) at a given input speed. Hence, the fan drive engages more quickly without adversely affecting disengagement performance. This invention may be utilized in any type of viscous fan drive, including an electronically controlled viscous fan drive as disclosed herein.

Further, the present invention provides an effective method for venting air within the input coupling assembly 38 specific to an electronically controlled viscous fan drive as the armature 23 moves between a valve open and valve closed position. Air is free to pass through the spaces created between the armature shaft and inner portion of the armature 23, therein minimizing the amount of electrical power needed to fully move the valve between a fully open and fully closed position.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. An electronically controlled viscous fan drive for use on an internal combustion engine, said fan drive comprising:
an output-coupling member including a housing member coupled to a cover member, said cover member including a plurality of non-continuous radially disposed lands and at least one continuous radially disposed land, said at least one continuous radially disposed land located radially outwardly of said plurality of non-continuous radially disposed lands, said plurality of non-continuous lands of said output-coupling member defining at least one cover member radial slot;
an actuator shaft partially disposed within said output-coupling member;
an input-coupling assembly coupled to said actuator shaft and including an input-coupling member, said input-coupling assembly and said actuator shaft capable of rotating at a given input speed, said input-coupling member substantially contained within said output-coupling member and including a plurality of non-continuous radially disposed input-coupling lands and at least one continuous radially disposed input-coupling land, said at least one continuous radially disposed input-coupling land located radially outwardly of said plurality of non-continuous radially disposed input-coupling lands, said plurality of non-continuous lands of said input-coupling member defining at least one input-coupling member radial slot;
an actuator shaft partially disposed within said output-coupling member;
a fluid operating chamber defined by said input-coupling member and said cover member;
at least one fill hole contained in said input-coupling member fluidically coupling said fluid reservoir chamber to said fluid operating chamber;
a valve disk coupled to said actuator shaft and disposed between said input-coupling member and said reservoir cover, said valve disk being closely coupled with said at least one fill hole and able to control an amount of viscous fluid entering said fluid operating chamber from said fluid reservoir chamber through said at least one fill hole;
an actuator subassembly coupled to said input-coupling assembly and including an external controller electrically coupled to an electrical coil, said electrical coil capable of being electrically activated by said external controller to generate a magnetic flux; and an armature coupled around a portion of said actuator shaft and within said actuator subassembly, said armature capable of axial movement along the length of said input-coupling assembly in response to said magnetic flux, therein moving said actuator shaft to position said valve disk relative to said at least one fill hole between an engaged position, a partially engaged position, or in a disengaged position;

wherein said engaged position is characterized such that said valve disk is positioned wherein said at least one fill hole is not covered by said valve disk, therein allowing maximum flow of said viscous fluid from said fluid reservoir chamber to said fluid operating chamber to drive said output-coupling member at a maximum rotational speed at said given input speed;

wherein said disengaged position is characterized such that said valve disk is positioned wherein said at least one fill hole is covered by said valve disk to prevent flow of said amount of viscous fluid from said fluid reservoir chamber to said fluid operating chamber; and wherein said partially engaged position is characterized such that said valve disk is positioned wherein said at least one fill hole is partially covered by said valve disk to allow a limited amount of said viscous fluid to flow from said fluid reservoir chamber to said fluid operating chamber to drive said output-coupling member at a rotational speed less than said maximum rotational speed.

2. The fan drive as set forth in claim 1, said fan drive further comprising a spring coupled along said actuator shaft, said spring biasing said valve disk in a first position in the absence of said magnetic flux, and said first position selected from the group consisting of said engaged position and said disengaged position.

3. The fan drive as set forth in claim 2, wherein said first position comprises said engaged position.

4. The fan drive as set forth in claim 3, wherein said spring is coupled between said valve disk and a hub portion of said input-coupling assembly.

5. The fan drive as set forth in claim 2, wherein said first position comprises said disengaged position.

6. The fan drive as set forth in claim 5, wherein said spring is coupled between said actuator shaft and said armature.

7. The fan drive as set forth in claim 1, said fan drive further comprising at least one sensor input electrically coupled to said external controller, said at least one sensor input capable of sensing the temperature of said internal combustion engine, wherein said external controller interprets said sensed temperature to determine the amount of electrical signal to send to said electrical coil in response to said sensed engine operating condition to maintain said engine in a desired operating range.

8. The fan drive as set forth in claim 1, wherein:
said actuator shaft and said armature define a space therebetween for a quantity of air to escape between a first chamber and a second chamber as said valve disk is moved from between said engaged position, said disengaged position, and said partially engaged position;
said first chamber is defined between said actuator shaft, said armature, and said input-coupling assembly; and
said second chamber is defined between said actuator shaft, said armature, a bushing, and a plug.

9. The fan drive as set forth in claim 8, wherein said space is defined between a square stock end of said actuator shaft and a rounded inner bore of said armature.

10. the fan drive as set forth in claim 1, said fan drive further comprising at least one cold pump out slot defined by said reservoir cover and said input-coupling member, wherein each of said at least one fill hole is defined between a respective one of said at least one cold pump out slot and said fluid reservoir chamber.

11. A viscous fan drive for use on an internal combustion engine having improved torque generation and an increase in fan speed at a given input speed, said viscous fan drive comprising:

a cover member including a plurality of non-continuous radially disposed lands and at least one continuous radially disposed land, said at least one continuous radially disposed land located radially outwardly of said plurality of non-continuous radially disposed lands, said cover member further including at least one cover member radial slot disposed across each of said at least one non-continuous radially disposed lands; and an input-coupling assembly including a plurality of non-continuous radially disposed input-coupling lands and at least one continuous radially disposed input-coupling land, said at least one continuous radially disposed input-coupling land located radially outwardly of said plurality of non-continuous radially disposed input-coupling lands, said input-coupling assembly further including at least one input-coupling radial slot disposed across each of said at least one non-continuous radially disposed input-coupling land;

wherein said cover member and said input-coupling assembly are closely coupled so as to define a shear space therebetween in which a quantity of viscous fluid is able to form a continuous film within a portion of said viscous shear space defined between said at least one continuous radially disposed land of said cover member and said at least one continuous radially disposed land of said input-coupling assembly.

12. The viscous fan drive as set forth in claim 11, wherein said at least one continuous radially disposed land of said cover member comprises at least two continuous radially disposed lands.

13. The viscous fan drive as set forth in claim 12, wherein said at least one continuous radially disposed land of said input-coupling assembly comprises at least two continuous radially disposed lands, and said cover member further includes at least one cover member radial slot disposed across each of said at least one non-continuous radially disposed lands.

14. The viscous fan drive as set forth in claim 11, wherein said at least one continuous radially disposed land of said input-coupling assembly comprises at least two continuous radially disposed lands.

15. The viscous fan drive as set forth in claim 11, wherein said at least one continuous radially disposed land of said cover member comprises at least two continuous radially disposed lands, and said at least one continuous radially disposed land of said input-coupling assembly comprises at least two continuous radially disposed lands.

16. The viscous fan drive as set forth in claim 11, wherein said input-coupling assembly comprises at least two input-coupling radial slots disposed across each of said at least one non-continuous radially disposed input-coupling land, said cover member further includes at least two cover member radial slots disposed across each of said at least one non-continuous radially disposed lands, and each one of said at least two input-coupling radial slots is aligned and coupled to a respective one of said cover member radial slots.

* * * * *